US007144130B2

(12) United States Patent
Toyota et al.

(10) Patent No.: US 7,144,130 B2
(45) Date of Patent: Dec. 5, 2006

(54) ILLUMINATION DEVICE

(75) Inventors: Makoto Toyota, Saitama (JP); Hitoshi Nakao, Saitama (JP); Yasuhiko Fukunaga, Saitama (JP)

(73) Assignee: Moritex Corporation, Tokyo (JP)

( * ) Notice: Subject to any disclaimer, the term of this patent is extended or adjusted under 35 U.S.C. 154(b) by 100 days.

(21) Appl. No.: 10/862,377

(22) Filed: Jun. 8, 2004

(65) Prior Publication Data

US 2004/0246742 A1 Dec. 9, 2004

(30) Foreign Application Priority Data

Jun. 9, 2003 (JP) ............................ 2003-163211

(51) Int. Cl.
*F21V 9/00* (2006.01)
*G02B 6/00* (2006.01)
*G05D 25/00* (2006.01)
*H05B 37/02* (2006.01)

(52) U.S. Cl. ...................... 362/230; 362/551; 362/552; 315/291

(58) Field of Classification Search ................ 362/230, 362/551, 552

See application file for complete search history.

(56) References Cited

U.S. PATENT DOCUMENTS

| | | | | |
|---|---|---|---|---|
| 4,237,475 A * | 12/1980 | Sekiguchi | ................... | 348/175 |
| 6,394,626 B1 * | 5/2002 | McColloch | ................. | 362/251 |
| 6,636,003 B1 * | 10/2003 | Rahm et al. | ................ | 315/179 |
| 6,921,920 B1 * | 7/2005 | Kazakevich | ................. | 257/81 |
| 2004/0052076 A1 * | 3/2004 | Mueller et al. | ............. | 362/293 |
| 2004/0264186 A1 * | 12/2004 | Tabell | ........................ | 362/231 |

FOREIGN PATENT DOCUMENTS

| | | |
|---|---|---|
| JP | 08-250771 | 9/1996 |
| JP | 2001-257379 | 9/2001 |
| JP | 2001-257397 | 9/2001 |
| JP | 2001-135857 | 5/2002 |
| JP | 2002-238846 | 8/2002 |
| JP | 2002-246651 | 8/2002 |
| JP | 2003-060223 | 2/2003 |

OTHER PUBLICATIONS

English language Abstract of JP 08-250771, Published Sep. 27, 1996.

English language Abstract of JP 2001-135857. Published May 18, 2002.

English language Abstract of JP 2002-238846, Published Aug. 27, 2002.

(Continued)

*Primary Examiner*—John Anthony Ward
*Assistant Examiner*—David Makiya
(74) *Attorney, Agent, or Firm*—Greenblum & Bernstein, P.L.C.

(57) ABSTRACT

An illumination apparatus for illumination of light by emitting light from LED for each of RGB colors capable of optionally setting a color temperature and controlling the brightness after the setting while maintaining the color temperature as it is, in which a light control circuit supplies a light control voltage for variably controlling the light quantity of the illumination light equally to each color setting circuit connected with LED of each color which is lit by a light quantity in proportion with a driving current and a color temperature setter of the color temperature setting circuit adjusts the light control voltage by a predetermined ratio to a control voltage, and a constant current circuit outputs a driving current in accordance with the control voltage to each LED for each of RGB colors.

8 Claims, 2 Drawing Sheets

OTHER PUBLICATIONS

English language Abstract of JP 2003-060223, Published Feb. 28, 2003.

English language Abstract of JP 2002-246651, Published Aug. 30, 2002.

English language Abstract of JP 2001-257397, Published Sep. 21, 2001.

English Language Abstract of JP2001-257379.

* cited by examiner

ILLUMINATION DEVICE

BACKGROUND OF THE INVENTION

1. Field of the Invention

The present invention concerns an illumination device for illuminating an illumination light at an optional color temperature by emission of LED (Light Emitting Diodes) for each of RGB colors each of which is lit at a light quantity in proportion with a driving current.

2. Statement of the Related Art

In recent production lines, image processing techniques have been utilized frequently for discriminating plural kinds of works, or inspecting the quality of works which are supplied and sent simultaneously in one identical line.

In image processing, an appropriate illumination light is illuminated from an illumination apparatus to a work and images of the work are taken up by an image pick-up device such as a CCD camera. In this case, selection of the illumination light is extremely important and it is necessary to set color and light quantity optimal to the color and the surface property of the work.

For example, when a white light is illuminated to a lustrous work, for example, semiconductor wafers, LCD electrodes, fabricated metal materials, surface mounted solder patterns, blister packs and aluminum foil packages, since reflected light therefrom intrudes in photographed images, the accuracy of the image processing is deteriorated. Further, when an illumination light including infrared light or ultraviolet light is exposed to a work covered with a heat sensitive resin or UV-ray curable resin the portion of the resin undergoes photosensitization.

Further, illumination apparatus capable of illuminating an optional color has been demanded not only in the field of image processing technique described above but also in the lighting design for shop illumination or show windows. Accordingly, an illumination apparatus using LED of three primary colors RGB has been proposed.

In the proposed apparatus, as shown in FIG. 3, three half-mirrors 41R, 41G, and 41B are located on an outgoing optical axis $X_W$, and LED 42R, 42G, and 42B for RGB are arranged each on the mirror optical axis $X_R$, $X_G$ and $X_B$, and light control circuits 43R, 43G, and 43B capable of optionally setting the light quantity for each of the LED 42R, 42G, and 42B are connected to them.

According to the apparatus, lights illuminated from LED 42R, 42G, and 42B are passed through the mirror optical axis $X_R$, $X_G$, and $X_B$, reflected on the half-mirror 41R, 41G, and 41B, mixed on the outgoing optical axis $X_W$ and outputted from the light outgoing end 44.

In this apparatus, since respective LED 42R, 42G, and 42B can emit lights each at an optional light quantity by the light control circuit 43R, 43G, and 43B, when each of them is illuminated at an equal light quantity, white light can be obtained, and a light can be illuminated while optionally setting the color temperature by varying the ratio of the light quantity.

However, after setting the color temperature of the light illuminated from the light outgoing end 44, it is difficult to increase or decrease the brightness while maintaining the color temperature as it is.

That is, as shown in FIG. 4, since the voltage-light quantity characteristic differs on every color, as well as it is not constant even for the LED of an identical color, even if the voltage supplied to each of them is changed equally, the color temperature can not be maintained constant.

Accordingly, individual adjustment was obliged so far while measuring the intensity for each of the wavelength components contained in the illumination light by using, for example, a spectrophotometer and adjusting operation was extremely troublesome.

In view of the above, the present invention intends for enabling simple control for the brightness while maintaining the color temperature as it is after setting the color temperature for the illumination light.

SUMMARY OF THE INVENTION

For solving the problem, the present invention intends to provide an illumination apparatus for illumination of light at an optional color temperature by emitting light from LED for each of RGB colors, comprising:

a color temperature setting circuit connected with LED of each color which is lit by a light quantity in proportion with a driving current and a light control circuit for supplying a light control voltage for variably adjusting the light quantity of the illumination light equally to each color temperature setting circuit, in which the color temperature setting circuit comprises a color temperature setter that adjusts the light control voltage by a predetermined ratio and output the adjusted control voltage and a constant current circuit for outputting the driving current in accordance with the control voltage to each LED, and a bundle fiber for mixing illumination lights from each LED is branched at a light incident end in accordance with the number of LED, and each of the optical fibers are bundled at the light outgoing ends.

According to the present invention, the light control voltage for variably adjusting the light quantity of the illumination light is supplied from the light control circuit equally to each color temperature setting circuit connected with each LED. That is, the light control voltage at an equal voltage level is supplied to each color temperature setting circuit.

The light control voltage inputted to each color temperature setting circuit is outputted as a control voltage adjusted by the color temperature setter to a voltage level at a predetermined ratio, and a driving current in accordance with the adjusted control voltage is outputted from the constant current circuit to each LED.

Generally, since the light quality of LED is in proportion with a driving current and the driving current is determined by the control voltage inputted to the constant current circuit, the light quantity of each LED can be controlled in the invention by the control voltage.

Since the control voltage is determined based on the light control voltage inputted to the color temperature setter and the ratio set by the color temperature setter, the ratio of the light quantity between individual LED can be set by optionally setting the ratio between the light control voltage and the adjusted control voltage by the color temperature setter and when the color control voltage is increased or decreased in this state, the entire brightness can be controlled while maintaining the ratio of the light quality between individual LED constant as it is.

Then, since the bundle fiber for guiding the illumination light of each LED is branched at the light incident end in accordance the number of LED and respective optical fibers are bundle at random at the light outgoing end, the lights of respective colors incident from respective incident ends are guided through respective optical fibers and mixed uniformly upon emission from the light outgoing end and then illuminated.

DESCRIPTION OF THE ACCOMPANYING DRAWINGS

DESCRIPTION OF PREFERRED EMBODIMENTS

The present invention is to be described specifically with reference to the drawings.

Figure 1:
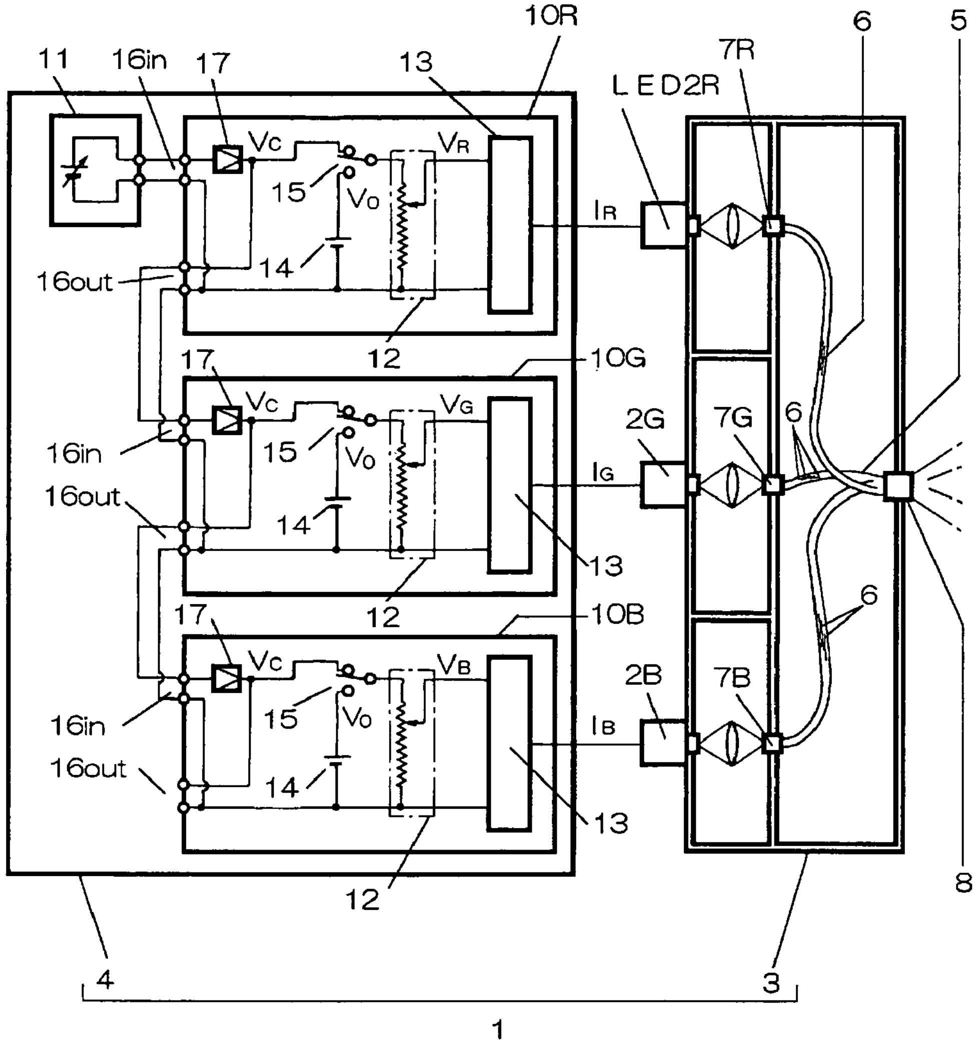
FIG. 1 is an explanatory view showing a schematic constitution of an illumination apparatus according to the present invention.

An illumination apparatus 1 shown in FIG. 1 is adapted to emit lights from LED (Light Emitting Diodes) 2R, 2G, and 2B for respective RGB colors thereby illuminating an illumination light of an optional color temperature and it comprises a light source 3 having LED 2R, 2G, and 2B and a control section 4 for controlling the color temperature and the brightness of the illumination light.

In the light source 3, are arranged LED 2R, 2G, and 2B for respective colors and bundle fibers 5 for mixing illumination lights of respective colors.

The bundle fibers is formed by bundling a number of optical fibers 6, 6,—and light incident ends 7R, 7G and 7B are branched in accordance with the number of the LED 2R, 2G, and 2B, and respective optical fibers are bundled evenly at the light outgoing end 8.

The control section 4 comprises color temperature setting circuits 10R, 10G, and 10B connected with the LED 2R, 2G, and 2B for respective colors, and a light control circuit 11 for supplying a light control voltage Vc for variably controlling the light quantity of the illumination light equally to each of the color temperature setting circuits 10R, 10G, and 10B.

Figure 2:
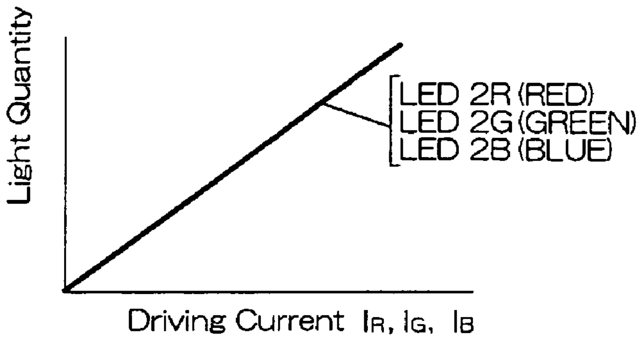
FIG. 2 is a graph showing a driving current-light quantity characteristic of LED.
Figure 3:
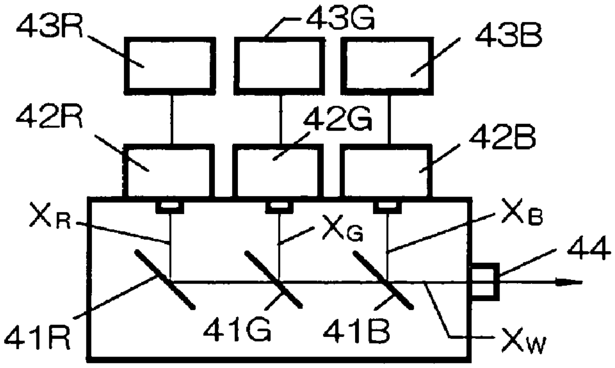
FIG. 3 is an explanatory view showing an existent illumination apparatus.
Figure 4:
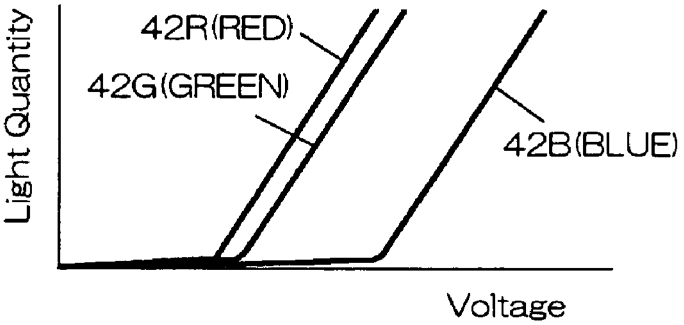
FIG. 4 is a graph showing a voltage-light quantity characteristic of LED.

Generally, as shown in FIG. 2, since LED 2R, 2G, and 2B are lit each at a light quantity in proportion with driving current $I_R$, $I_G$, and $I_B$ when the rating is identical, and the driving current-light quantity characteristic is equal for each of them, the light quantity can be controlled on every individual LED 2R, 2G, and 2B by controlling the driving current $I_R$, $I_G$ and $I_B$.

Then, each of the color temperature setting circuits 10R, 10G, and 10B comprises a color temperature setter 12 that adjusts a light control voltage Vc by a predetermined ratio to the adjusted control voltage ($V_R$, $V_G$, $V_B$) and a constant current circuit 13 for outputting a driving current ($I_R$, $I_G$, $I_B$) in accordance with the control voltage ($V_R$, $V_G$, $V_B$) to each LED (2R, 2G, 2B) and adapted such that the driving current ($I_R$, $I_G$, $I_B$) can be controlled for each LED (2R, 2G, 2B) by adjusting the ratio of the control voltage ($V_R$, $V_G$, $V_B$).

Further, each of color temperature setting circuits 10R, 10G, and 10B is provided with a switch 15 for supplying the light control voltage Vc supplied from the outside and a reference voltage $V_0$ of an internal constant voltage supply 14 switchingly.

The color temperature setter 12 is adapted such that the ratio of the control voltage $V_R$, $V_G$, and $V_B$ can be set, for example, by a variable resister of the color temperature setter 12 relative to the light control voltage Vc or the standard voltage $V_0$ supplied switchingly by the switch 15.

Each of the color temperature setting circuit 10R, 10G, and 10B is provided with an input terminal 16—in for the light control voltage Vc and an output terminal 16—out for outputting the inputted light control voltage Vc as it is with no attenuation by way of a buffer 17. When the light control circuit 11 is connected with the input terminal 16—in for any one of the color temperature setting circuits 10R, 10G and 10B and then the output terminals 16—out and, in the same manner, the input terminals 16—in for the color temperature setting circuits 10R, 10G and 10B are connected with each other, a constant light control voltage is supplied to all of the color temperature setting circuits 10R, 10G, and 10B.

The example of the constitution of the present invention is as has been described above and the operation thereof is to be explained.

Each of the LED 2R, 2G, and 2B for each of the colors has an identical driving current/light quantity characteristic and emits light at a light quantity in proportion with each driving currents $I_R$, $I_G$, and $I_B$.

Then, at first, the switch 15 in each of the color temperature setting circuits 10R, 10B, and 10B is turned on the side of the internal constant voltage power supply 14 and the ratio for the control voltage $V_R$, $V_G$, and $V_B$ is set by a variable resister of the color temperature setter 12 relative to the standard voltage $V_0$.

For example, in a case of emitting a white light, when it is set as: control voltage/reference voltage$=V_R/V_0=V_G/V_0=V_B/V_0=C$, the driving current outputted from each of the constant current circuits 13 is equalized as: $I_R=I_G=I_B$. Accordingly, lights of three primary colors of RGB are emitted from LED 2R, 2G, and 2B each at an identical light quantity, which are passed through the bundle fibers 5, mixed at the light outgoing end 8 and emitted as a white light.

Subsequently, when the switch 15 is turned on the side of the light control circuit 11 and the light control voltage Vc is adjusted, the brightness of the light can be changed in the state of the white light as it is.

Further, in a case of increasing the ratio of the light quantity for the red light, when the color temperature setting circuits 10R, 10G, 10B are set such that the control voltage/reference voltage$=V_R/V_0$ for the red color is higher, the driving current $I_R$ outputted from the constant current circuit 13 of the color temperature setting circuit 10R increases. Accordingly, the light quantity of the LED 2R is increased compared with the light quantity of LED 2G, 2B, and the optical outputs are passed through the bundle fibers 5, mixed at the optical outgoing end 8 and emitted as a light at a higher light quantity ratio for the red light.

Then, when the switch 15 is turned on the side of the light control circuit 11 and the light control voltage Vc is adjusted, the brightness of the light can be varied while maintaining the higher light quantity ratio for the red light as it is.

As has been described above, according to the present invention, since the intensity of the driving current relative to the light control voltage can be set by the color temperature setting circuit connected with each LED for RGB lit at a light quantity in proportion with the driving current and the light control voltage supplied equally to each color temperature setting circuits can be adjusted variably by the light control circuit, this can provide an excellent effect that the color temperature of the illumination light can be determined optionally by deciding the light quantity ratio for each of LEDs for RGB colors by the color temperature setting circuit and the brightness can be controlled while maintaining the color temperature (ratio of light quantity) of the illumination light constant as it is by increasing or decreasing the light control voltage supplied from the light control circuit.

The present disclosure relates to subject matter contained in priority Japanese Patent Application No. 2003-163,211 filed on Jun. 9, 2003, the contents of which is herein expressly incorporated by reference in its entirety.

What is claimed is:

1. An illumination apparatus that emits light of a particular color temperature by emitting light from a red LED, a green LED, and a blue LED, comprising:

a plurality of color temperature setting circuits, each color temperature setting circuit being connected to one of the red LED, the green LED, and the blue LED, each of the red LED, the green LED, and the blue LED being supplied with a driving current; and a light control circuit that supplies a light control voltage to each color temperature setting circuit; and a bundle of fibers, comprising a plurality of fibers which are each associated with one of the red LED, the green LED, and the blue LED, the bundle of fibers combining lights emitted by the red LED, the green LED and the blue LED, wherein each color temperature setting circuit comprises a color temperature setter that generates an adjusted control voltage from the light control voltage in accordance with a predetermined ratio, and a constant current circuit that outputs a driving current corresponding to the adjusted control voltage to a connected LED, wherein each color temperature setting circuit comprises an internal power supply and a switch which alternately supplies the light control voltage and a voltage from the internal power supply to the color temperature setter.

2. An illumination apparatus that emits light of a particular color temperature by emitting light from a red LED, a green LED, and a blue LED, comprising:

a plurality of color temperature setting circuits, each color temperature setting circuit being connected to one of the red LED, the green LED, and the blue LED, each of the red LED, the green LED, and the blue LED being supplied with a driving current; and a light control circuit that supplies a light control voltage to each color temperature setting circuit, wherein each color temperature setting circuit comprises a color temperature setter that generates an adjusted control voltage from the light control voltage in accordance with a predetermined ratio, and a constant current circuit that outputs a driving current corresponding to the adjusted control voltage to a connected LED, wherein each color temperature setting circuit comprises an internal power supply and a switch which alternately supplies the light control voltage and a voltage from the internal power supply to the color temperature setter.

3. The illumination apparatus according to claim 1, wherein the driving current supplied to each of the red LED, the green LED, and the blue LED is controlled by adjusting the predetermined ratio of a corresponding color temperature setter.

4. The illumination apparatus according to claim 1, wherein each color temperature setter comprises a variable resistor.

5. The illumination apparatus according to claim 1, wherein the color temperature of a combined light outputted by the bundle of fibers is controlled by adjusting a predetermined ratio of at least one color temperature setter, and the brightness of the combined light is controlled by adjusting the light control voltage.

6. The illumination apparatus according to claim 1, wherein, for each fiber of the bundle of fibers, one end of the fiber connects to one of the red LED, the green LED, and the blue LED, and the other end of the fiber is bundled with ends of the other fibers to combine the lights emitted by the red LED, the green LED and the blue LED.

7. The illumination apparatus according to claim 2, wherein the driving current supplied to each of the red LED, the green LED, and the blue LED is controlled by adjusting the predetermined ratio of a corresponding color temperature setter.

8. The illumination apparatus according to claim 2, wherein each color temperature setter comprises a variable resistor.

* * * * *